Feb. 1, 1944.   E. HARPOOTHIAN   2,340,589
LOCK NUT
Filed Nov. 25, 1942

*Edward Harpoothian*
INVENTOR.

BY *J Edwin Coates*
ATTORNEY

Patented Feb. 1, 1944

2,340,589

UNITED STATES PATENT OFFICE 2,340,589

LOCK NUT

Edward Harpoothian, West Los Angeles, Calif., assignor to Douglas Aircraft Company, Inc., Santa Monica, Calif.

Application November 25, 1942, Serial No. 466,907

6 Claims. (Cl. 151—7)

This invention relates to self-locking nuts and particularly to self-locking nuts of the type known as elastic stop nuts in which a nut body of relatively incompressible, inflexible material like steel is faced with a locking plate of relatively elastically flexible compressible material like vulcanized fiber, the locking plate having an alined opening of smaller diameter than the threaded bore of the body.

The locking plate in elastic stop nuts as now constructed is smooth-bored. A threaded bolt or screw as it passes through the nut body into the locking plate forms threads in the smooth bore of the locking plate. These threads by reason of their elastic yieldability exert against the advancing thread faces of the bolt a pressure which is transmitted by the bolt to the trailing thread faces in engagement with the threaded bore of the nut, this pressure setting up a frictional lock preventing the nut from turning on the bolt. To secure this pressural relationship the locking plate must be held against axial movement away from the nut. It is also a condition for successful performance of the locking nut that it be held against turning both as the bolt enters the bore of the plate so that the bolt may form threads in the bore and also after the thread forming operation has begun so that the locking plate will not be pushed away from the nut body but will remain without turning in contact or in closed spaced relation therewith, a necessary condition for development of the pressural relationship described above. A means for preventing rotation will also prevent axial movement after the initial threads have been formed in the locking plate and a means for preventing axial movement will enable the bolt to initiate the forming of threads and will then prevent rotation of the locking plate. Because of the flexible compressible nature of the material of the locking plate, the newly formed threads therein will elastically grip the threads of the bolt, so that the locking plate will not turn relatively to the bolt and if the locking plate is also held from turning, obviously the bolt is prevented from turning in the nut. Thus an additional locking action is effected by the locking plate.

The prior art reveals several expedients for preventing the locking plate from being pushed away from the nut body and also from being turned by the advancing threaded shank of the bolt or other fastening member. Some of these expedients accomplish both purposes.

The nut body may be provided with a retaining wall which encircles the plate and is provided with locking means for engaging the plate, such as a bent over flange at the outer rim of the wall which either prevents outward axial movement of the plate or prevents rotative movement thereof or both, as disclosed in Patent No. 1,550,282 of T. G. Rennerfelt and Patent No. 2,153,681 to C. A. Swanstrom. The locking plate may be adhesively bonded to the nut as shown in Patent No. 2,150,194 to H. B. Thomas.

A disadvantage of the former construction is expense of manufacture. A difficulty with the latter construction is that the adhesive bond between locking plate and nut body is likely to be broken because of the great mechanical advantage of the screw threads in thrusting the threaded shank against the opposing annular surface surrounding the unthreaded bore of the locking plate. For it is to be remembered that in all these prior art nut structures of the elastic stop nut type, the bore of the locking plate is without threads and is of smaller diameter than that of the crests of the threads of the bolt, the latter being substantially the same as the diameter of the roots of the threads of the nut body. The adhesive bond must also resist the shearing stress set up by reason of the tendency of the locking plate to turn as the threaded bolt takes hold in the smooth bore of the locking plate.

It is one object of this invention to provide a nut structure and particularly a nut structure of the elastic stop nut type which will minimize the axial thrust and torsional stress between nut body and locking plate, especially at the time the bolt enters the bore of the locking plate, by preforming the bore of the locking plate with threads of the same pitch but smaller diameter than those of the nut body. The lesser thrust and the lesser torsional stress thus attained are of special advantage in nut structures of the elastic stop nut type in which an adhesive bond is one or the only means for preventing axial and turning movement of the locking plate.

It is another object of the invention to provide a nut structure in which the nut body and locking plate are formed of relatively inflexible incompressible and relatively flexible compressible materials respectively with a plurality of registering bores, the bores of the locking plate being smaller than those of the nut body, to the end that the tendency of any one bolt to locally thrust ahead or turn the locking plate may be inhibited by previously positioned bolts. This is of special advantage in nut structures in which an adhesive bond is one or the only means for preventing axial and turning movement of the locking plate.

The extended character of the bonding joint in a nut structure having an extended body and extended locking plate with a large number of registering bores serves to inhibit axial or rotative displacement of the locking strip whether the smaller bores of the latter be threaded or smooth.

The flexible character of the locking plate and its extended surface in contact with the equally extended surface of the nut body prevent fluid leakage either along the thread faces of the locking plate or along the joint between the locking plate and nut body.

It is therefore another object of this invention to provide a multi-bored nut structure of extended surface area the parts of which will not be axially separated or relatively rotated when installed, and which will not permit the leakage of fluids.

In the drawing which is for illustrative purposes only,

Figure 1:
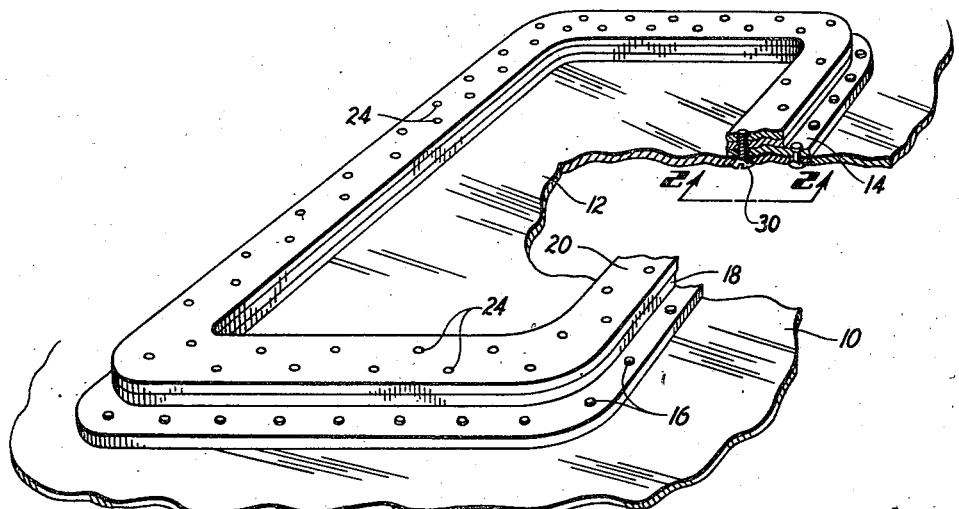
Figure 1 is a perspective view showing a portion of a tank wall with a lidded opening secured in place by a nut structure embodying this invention.
Figure 2:
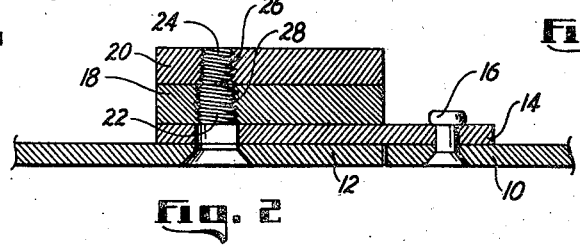
Figure 2 is a sectional view taken as indicated by the arrows 2—2 of Figure 1 with the fastening screw removed.

One application of the invention is illustrated in Figures 1 and 2. It will be of course understood that the invention is not limited to this one application or to the specific structures shown in the drawing and that many of the details of these structures are of a purely incidental character.

Figure 1 shows a portion of an airplane surface 10, which, in this particular instance, is the outer wall of a liquid fuel tank, the face of the surface which shows as the upper face in the drawing being the face in contact with the liquid fuel. The inspection opening of the tank is fitted with a cover plate 12 which is fair with the surface 10. The cover plate is removably secured to a flange strip 14 which is in turn permanently secured to the surface 10 by rivets 16.

The means by which the cover plate 12 is secured to the flange strip 14 is a nut structure of this invention. It comprises a nut body 18 in the form of a rectangular strip with rounded corners, and a locking plate 20 in the form of a second co-extensive rectangular strip of the same surface configuration. The body 18 is made of steel and the locking plate of a relatively elastically flexible compressible material such as vulcanized fiber. The locking plate 20 is preferably adhesively bonded to the nut body 18.

The body 18 is drilled and tapped to provide the threaded bores 22 preferably arranged in parallel rows, the bores in one row being laterally staggered with respect to the bores in the other row. The locking plate 20 is similarly drilled and tapped to provide threaded bores 24 spaced to register with the bores 22. Each bore 24 has threads 26 the root and crest diameters of which are substantially less than the root and crest diameters respectively of the threads 28 of the threaded bores 22 as is shown in Figure 2 of the drawing. The pitch of threads 26 and 28 is the same. The root diameter of threads 26 is substantially greater than the crest diameter of threads 28.

The cover plate 12 and flange strip 14 are countersunk and smoothbored to receive fastening screws 30 which are of a size and pitch to properly engage the threads 28 of the bores 22 of the nut body strip 18. When the screws 30 are turned in the bores 22 the advancing bevelled sides of the initial screw threads at their ends will engage the initial threads 26 of the bores 24 of the locking strip 20 since the roots of threads 26 are of larger diameter than the roots of the screw threads, the latter dimension being substantially the same as the crest diameter of the threads 28. But since these roots have a diameter substantially smaller than the crests of the screw threads the screw threads will laterally compress the material of the locking plate and when the screw is forced completely through the locking plate it will be held firmly in locked relation therewith.

The threads 26 offer an initial engagement with the screw threads which lock the locking plate against axial movement away from the nut body. If adhesively bonded this bond is not broken. After two screws are installed, the remaining screws may be inserted with no danger of shearing the bonding joint and less danger of pushing the fiber locking plate from the nut body and thus breaking the bonding joint; and this is true whether the bores 24 are smooth or tapped to a smaller diameter thread than bores 22. The fiber locking nut provides a fluid seal at the threaded joint with the screw and at the plane joint with the nut body 18.

Figure 3:
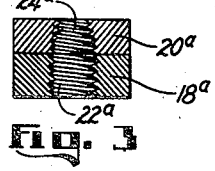
Figure 3 is a sectional view of a single bored nut embodying the invention in modified form.
Figure 4:
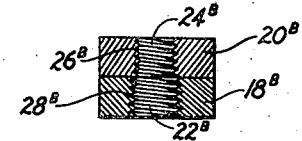
Figure 4 is a sectional view of a single bored nut embodying the invention in still another modified form.

Figure 3 shows a modified form of the invention in which the nut body 18ª has a standard threaded bore 22ª and the locking fiber plate 20ª has a tapered threaded bore 24ª formed by tapping the bore with the tapered end portion only of a die tap of the same size used to form threads 22ª. Figure 4 shows a modified form of the invention in which the nut body 18ᴮ has a bore 22ᴮ with standard threads 28ᴮ and the locking fiber plate 20ᴮ has a parallel sided bore 24ᴮ of smaller diameter than bore 22ᴮ and formed with non-standard threads 26ᴮ of the same pitch as the threads 28ᴮ.

It will be understood the invention as to the feature of smaller diametered threads in the locking plate may be embodied in single bored nuts such as are shown in Figures 3 and 4 or in multi-bored strip nuts and the like such as are shown in Figures 1 and 2.

Figure 5:
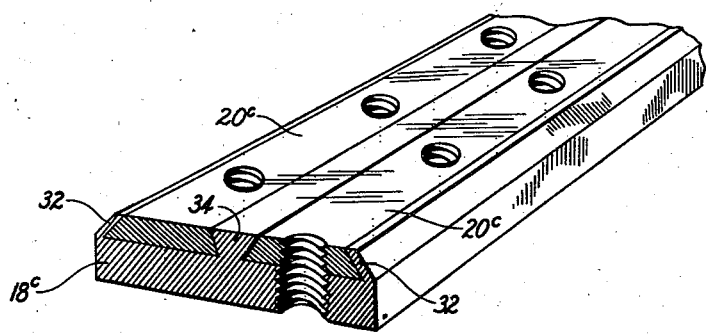
Figure 5 is a perspective view of a multi-bored strip nut structure embodying the invention in another form.

Figure 5 illustrates a form of the invention in which the locking plate 20ᶜ is not adhesively bonded to the body 18ᶜ but is held against outward or rotational movement by a center wedge shaped rib 34 and lateral flanges 32 which are integrally formed with the body 18ᶜ. The flanges 32 are inclined outwardly before assembly. After the locking strips 20ᶜ are placed in position with their inner edges fitted against the downwardly converging side faces of the rib 34, the flanges are bent inwardly against the outer edges of the locking strips 20ᶜ.

The words "locking plate" are used herein to include either a plate, disc or washer of circular, hexagonal or other shape for a single bored nut structure or an elongated strip or plate for a multi-bored nut structure.

The word "root" as applied to threads designates the bottom of the opening between adjacent threads whether the threads be formed on the interior bore surface of a nut or the exterior peripheral surface of a bolt or screw. The word "crest" similarly designates the top of a thread at one side or the other of the opening between threads whether the threads be formed on an interior bore surface or an exterior peripheral surface.

I claim:

1. In a nut structure the combination of: a nut body of relatively inflexible, incompressible material and having a threaded bore; and a locking plate of relatively elastically flexible compressible material for placement in juxtaposition with said body, said locking plate having a bore for registry with the threaded bore of said body, said bore having, at least adjacent its juxtaposed end, threads which are of the same pitch as the threaded bore of said body and are of a root diameter which is substantially smaller than the root diameter and substantially larger than the crest diameter of the threads of said threaded bore of said body, the root diameter of the threads of the bore of the locking plate being sufficiently small that a bolt having a diameter and having threads to matingly fit the threaded bore of the nut body will, when threaded through said bore of the nut body, initially threadedly engage the threads of the bore of the locking plate, thereby providing a means for axially fixing the locking plate with respect to the body, and will subsequently formingly enlarge the root diameter of the threads of the bore of the locking plate and formingly move radially outwardly the thread faces thereof, thereby establishing a resilient pressural frictional gripping engagement between the thread faces of the bolt and the thread faces of the locking plate.

2. In a nut structure the combination of: a nut body of relatively inflexible, incompressible material and having a threaded bore; and a locking plate of relatively elastically flexible compressible material for placement in juxtaposition with said body, said locking plate having a bore for registry with the threaded bore of said body, said bore having, at least adjacent its juxtaposed end, threads which are of the same pitch as the threaded bore of said body and are of a diameter at the crests of the threads which is substantially smaller than and of a root diameter which is substantially larger than the diameter at the crests of the threads of the threaded bore of said body, the root diameter of the threads of the bore of the locking plate being sufficiently small that a bolt having a diameter and having threads to matingly fit the threaded bore of the nut body will, when threaded through said bore of the nut body, initially threadedly engage the threads of the bore of the locking plate, thereby providing a means for axially fixing the locking plate with respect to the body, and will subsequently formingly enlarge the root diameter of the threads of the bore of the locking plate and formingly move radially outwardly the thread faces thereof, thereby establishing a resilient pressural frictional gripping engagement between the thread faces of the bolt and the thread faces of the locking plate.

3. The combination defined in claim 1 in which the locking plate and body are permanently secured together with the bore of the locking plate in registry with the bore of the body.

4. In a nut structure the combination of: a nut body of relatively inflexible, incompressible material and having a threaded bore; and a locking plate of relatively elastically flexible compressible material for placement in juxtaposition with said body, said locking plate having a threaded bore for registry with and of the same pitch as the threaded bore of said body and of a diameter tapering from a size not greater than that of the bore of said body at the juxtaposed face of said locking plate to a bore of substantially smaller diameter at an axial distance from said face, the root diameter of the threads of the bore of the locking plate being sufficiently small that a bolt having a diameter and having threads to matingly fit the threaded bore of the nut body will, when threaded through said bore of the nut body, initially threadedly engage the threads of the bore of the locking plate, thereby providing a means for axially fixing the locking plate with respect to the body, and will subsequently formingly enlarge the root diameter of the threads of the bore of the locking plate and formingly move radially outwardly the thread faces thereof, thereby establishing a resilient pressural frictional gripping engagement between the thread faces of the bolt and the thread faces of the locking plate.

5. In a nut structure, the combination of: a nut body in the form of a plate of relatively inflexible, incompressible material having a plurality of threaded bores spaced over said plate; and a locking plate of relatively elastically flexible compressible material for placement against said body, said locking plate having a plurality of threaded bores for respective registry with, and of the same pitch as the threaded bores of said body, the root diameter of the threads of the diameters than those of the threaded bores of said body, the root diameter of the threads of the bore of the locking plate being sufficiently small that a bolt having a diameter and having threads to matingly fit one of the threaded bores of the nut body will, when threaded through said bore of the nut body, initially threadedly engage the threads of the registering bore of the locking plate, thereby providing a means for axially fixing the locking plate with respect to the body, and will subsequently formingly enlarge the root diameter of the threads of the bore of the locking plate and formingly move radially outwardly the thread faces thereof, thereby establishing a resilient pressural frictional gripping engagement between the thread faces of the bolt and the thread faces of the locking plate.

6. In a nut structure, the combinaiton of: a nut body in the form of a plate of relatively inflexible, incompressible material having a plurality of threaded bores spaced over said plate; and a combination locking and fluid-seal plate of relatively elastically flexible compressible material for placement against said body, said locking plate having a plurality of bores for respective registry with and of a slightly smaller maximum diameter than that of the roots of the threads of the threaded bores of said body, the root diameter of the threads of the bore of the locking plate being sufficiently small that a bolt having a diameter and having threads to matingly fit one of the threaded bores of the nut body will, when threaded through said bore of the nut body, initially threadedly engage the threads of the registering bore of the locking plate, thereby providing a means for axially fixing the locking plate with respect to the body, and will subsequently formingly enlarge the root diameter of the threads of the bore of the locking plate and formingly move radially outwardly the thread faces thereof, thereby establishing a resilient pressural frictional gripping engagement between the thread faces of the bolt and the thread faces of the locking plate.

EDWARD HARPOOTHIAN.

CERTIFICATE OF CORRECTION.

Patent No. 2,340,589.                                   February 1, 1944.

EDWARD HARPOOTHIAN.

It is hereby certified that error appears in the printed specification of the above numbered patent requiring correction as follows: Page 3, second column, lines 43, 44 and 45, claim 5, strike out the words "said body, the root diameter of the threads of the diameters than those of the threaded bores of said body" and insert instead --said body and of substantially smaller root diameters than those of the threaded bores of said body--; and that the said Letters Patent should be read with this correction therein that the same may conform to the record of the case in the Patent Office.

Signed and sealed this 18th day of April, A. D. 1944.

Leslie Frazer (Seal)                               Acting Commissioner of Patents.